United States Patent
Yoshiya

[11] Patent Number: 6,116,033
[45] Date of Patent: Sep. 12, 2000

[54] OUTSIDE AIR CONDITIONER

[75] Inventor: Eiji Yoshiya, Tokyo, Japan

[73] Assignee: NEC Corporation, Tokyo, Japan

[21] Appl. No.: 09/208,844

[22] Filed: Dec. 10, 1998

[30] Foreign Application Priority Data

Dec. 10, 1997 [JP] Japan ........................ 9-339920

[51] Int. Cl.⁷ .................................................. F25D 17/06
[52] U.S. Cl. .......................... 62/91; 62/180; 62/310
[58] Field of Search .................... 62/91, 179, 180, 62/310

[56] References Cited

U.S. PATENT DOCUMENTS

| | | | |
|---|---|---|---|
| 1,965,078 | 7/1934 | Hewitt et al. | 62/91 |
| 2,105,882 | 1/1938 | Fleisher | 62/91 |
| 3,277,954 | 10/1966 | Meckler | 62/91 |
| 3,861,164 | 1/1975 | Brown | 62/91 |
| 5,056,588 | 10/1991 | Carr | 165/10 |

FOREIGN PATENT DOCUMENTS 10-267321  10/1998  Japan .

Primary Examiner—William Doerrler
Assistant Examiner—Melvin Jones
Attorney, Agent, or Firm—Foley & Lardner

[57] ABSTRACT

While water sprayed from an air washer is consumed by humidification, excess water which is not consumed accumulates in a circulating water tank and is supplied to the air washer again through a heat exchanger by a circulating pump. Water is supplied to the heat exchanger through a piping to make up for a shortage of water, where the water is cooled and fed to the air washer. Accordingly, the water supplied to the air washer is composed of excess humidification water from the circulating water tank which is circulated by the circulating pump and water supplied through the piping, and the water from two sources is supplied to the air washer after being cooled by the heat exchanger. Thus the excess humidification water stored in the circulating water tank has a temperature lower than the room temperature and can prevent propagation of micro-organisms which can propagate at a room temperature.

7 Claims, 2 Drawing Sheets

OUTSIDE AIR CONDITIONER

BACKGROUND OF THE INVENTION

1. Field of the Invention

This invention relates to an outside air conditioner, and more particularly to an outside air conditioner for a clean room.

2. Description of the Related Art

FIG. 1 shows a flow diagram of an example of a conventional outside air conditioner. Referring to FIG. 1, the conventional outside air conditioner shown includes a heating coil 1 for heating outside air, mean temperature gauge 2 for measuring a mean temperature of outside air, air washer 3 for removing dust form outside air, cooling coil 4, heating coil 5, fan 6 for discharging supplied outside air to the outside, circulating pump 7, piping 8, outside air intake opening 9 for taking in outside air, and circulating water tank 10.

In the conventional outside air conditioner, outside air taken in through outside air intake opening 9 is heated to a temperature equal to or higher than 10° C. by heating coil 1 under the control of mean temperature gauge 2. Then, the outside air is cleaned and humidified by air washer 3, and then the temperature and humidity of the outside air are adjusted by cooling coil 4 and heating coil 5, and thereafter the outside air is supplied into a room by fan 6.

While, in the conventional outside air conditioner, duct is removed by air washer 3, air washer 3 does not exhibit a high dust removal efficiency for vaporized impurities of nitrogen oxides and sulfur oxides in the form of gas since water sprayed from air washer 3 has a room temperature. Particularly in manufacturing semiconductors, since very small objects are handled, impurities in the air such as nitrogen oxides and sulfur oxides may have a bad influence on the yield of products, and there are problems in the use of outside air conditioners in an environment where semiconductors are manufactured.

Further, while, in the conventional outside air conditioner, sprayed water is consumed in the humidification of air, and excess water remains in a circulating water tank 10. Since the temperature of the water staying in circulating water tank 10 has a room temperature, micro-organisms, which propagate in the water of room temperatures, such as legionella pneumophila, may possibly propagate in the water.

SUMMARY OF THE INVENTION

It is an object of the present invention to provide an outside air conditioner which can prevent propagation of micro-organisms, which propagate in the water of room temperatures.

In order to attain the object described above, according to the present invention, in an outside air conditioner wherein water is sprayed from an air washer to the outside air taken in to clean and humidify the air and then the temperature and the humidity of the air are adjusted, and thereafter the outside air is taken out to the outside, a means for supplying water having a temperature lower than a room temperature to the air washer is provided.

And according to the present invention, the outdoor air conditioner includes an outside air intake opening for taking in outside air, a mean temperature gauge for measuring a mean temperature of the outside air taken in through the outside air intake opening, a heating means for heating the outside air taken in through the air intake opening to a temperature equal to or higher than a predetermined temperature based on the temperature of the mean temperature gauge, an air washer for spraying water to the outside air heated by the heating means to clean and humidify it, a circulating water tank for storing excess humidifying water sprayed from the air washer, a circulating pump for circulating the water stored in the circulating water tank to the air washer, a piping for making up water to be sprayed from the air washer, a heat exchanger for cooling the water from the circulating water tank and the water from the piping to supply the cooled water to the air washer, an adjusting means for adjusting the temperature and the humidity of the outside air humidified and cleaned by the air washer, and a fan for blowing the outside air, whose temperature and humidity have been adjusted by the adjusting means, to the outside of the outside air conditioner.

In the present invention, the outside air taken in through the outside air intake opening is heated by the heating means under the control of the mean temperature gauge, and water is then sprayed to the heated outside air from the air washer, whereby, vaporized nitrogen oxides and sulfur oxides in the outside air are dissolved into the water. In that instance, since the water cooled by the heat exchanger is supplied to the air washer from the circulating water tank and the piping, the water to be sprayed from the air washer can be set to a lower temperature than the room temperature.

Here, preferably the heat exchanger cools the water to be supplied to the air washer to a temperature of 10° C., since the temperature and humidity of the outside air humidified and cleaned by the air washer can be adjusted by the adjusting means of the conventional type.

The above and other objects, features, and advantages of the present invention will become apparent from the following description referring to the accompanying drawings which illustrate an example of a preferred embodiment of the present invention.

DETAILED DESCRIPTION OF THE PREFERRED EMBODIMENTS

Figure 1:
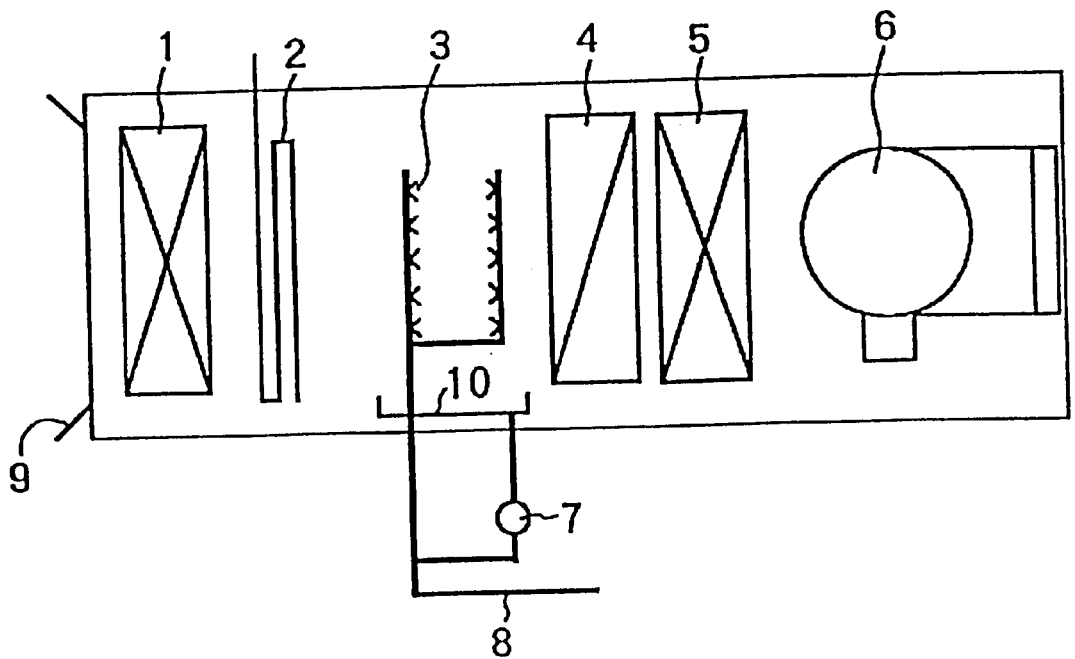
FIG. 1 is a flow diagram of a conventional example.
Figure 2:
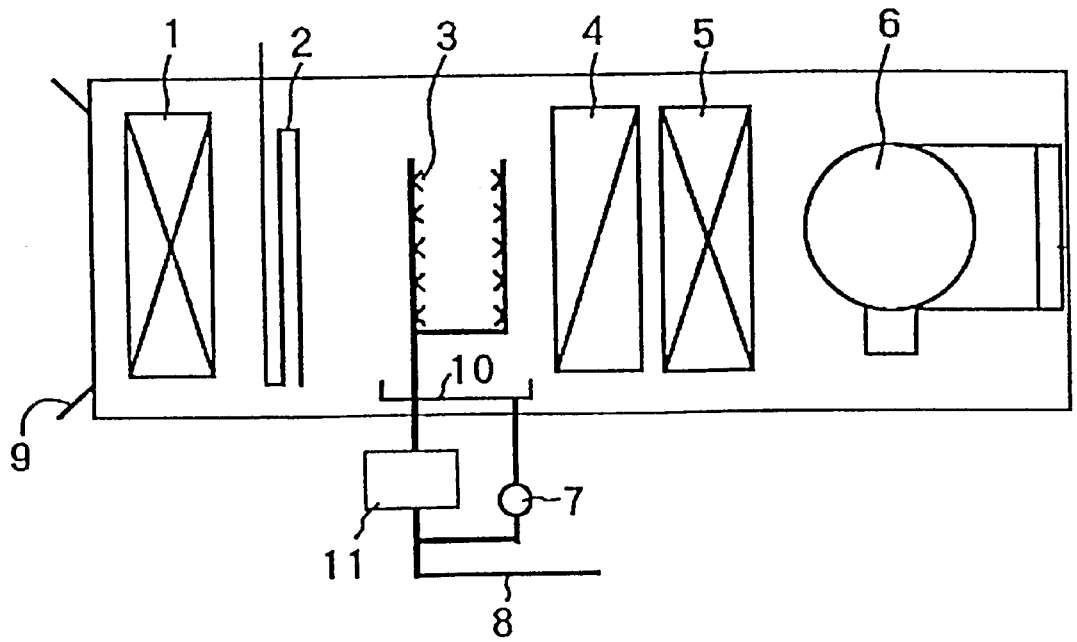
FIG. 2 is a flow diagram of an embodiment of the present invention.

In the following, embodiments of the present invention are described with reference to the drawings. FIG. 2 shows a flow diagram of an embodiment of an outside air conditioner according to the present invention. In FIG. 2, like components to those of FIG. 1 are given like reference numerals. The embodiment shown in FIG. 2 includes a heating coil 1 for heating outside air, a mean temperature gauge 2 for measuring a mean temperature of the outside air, an air washer 3 for removing dust from the outside air, a cooling coil 4, a heating coil 5, a fan 6 for discharging the outside air supplied to the outside, a circulating pump 7, pipings 8, an outside air intake opening 9 for taking in the outside air, a circulating water tank 10, and a heat exchanger 11.

The outside air conditioner of the present embodiment is characterized in that it includes the heat exchanger 11 which cools water to be supplied to the air washer 3 and the water cooled by the heat exchanger 11 is supplied to the air washer 3 so that it is sprayed from the air washer 3.

Now, the function of the present embodiment will be described. Outside air taken in from the outside air intake opening 9 is heated to a temperature equal to or higher than 10° C. by the heating coil 1 under the control of the mean temperature gauge 2, and it is then humidified and cleaned using the water sprayed from the air washer 3. The water to be used in the air washer 3 is cooled by the heat exchanger 11. The water sprayed from the air washer 3 is consumed in the humidification of the air. However, excess water which has not been consumed stays in the circulating water tank 10 and is supplied again to the air washer 3 through the heat exchanger 11 by the circulating pump 7. And makeup water is fed to the heat exchanger 11 through the piping 8, whereby the water is cooled and supplied to the air washer 3.

As a result, the water supplied to the air washer 3 is composed of the humidification excess water from the circulating water tank 10 circulated by the circulating pump 7 and the water supplied through the piping 8, and supplied to the air washer 3 after being cooled by the heat exchanger 11. And hence the excess humidification water staying in the circulating water tank 10 has a temperature lower than the room temperature and can prevent the propagation of micro-organisms which can propagate at the room temperature.

Nitrogen oxides and sulfur oxides in the form of vapor contained in the outside air are dissolved into the water sprayed from the air washer 3 and the outside air free from those oxides is then dehumidified by the cooling coil 4 and heated then by the heating coil 5, and blown into the room, as air free from nitrogen and sulfur oxides, by fan 6. Here, since the water sprayed from the air washer 3 is cooled water, removal efficiency of nitrogen oxides and sulfur oxides, vaporized in the air, is much higher than that of the prior art in which water having a room temperature is used.

Another embodiment of the present invention will be described. The embodiment is similar in constitution to that of FIG. 2; however, the water is cooled to a temperature of 10° C. by the heat exchanger 11. Since the water to be sprayed from the air washer 3 has a temperature of 10° C., the temperature of the outdoor air which has passed the cooling coil 4 is equal to or higher than 10° C., and the requirements for air (23° C., 45%) to be supplied to the clean room can be satisfied easily by heating the outside air by means of the heating coil 5. Thereafter, the outside air is blown into the room by the fan 6, as the air free from nitrogen and sulfur oxides.

The foregoing will be described more specifically with reference to a wet air chart of FIG. 3. In the wet air chart, the axis of abscissa indicates temperatures, and the axis of ordinate indicates absolute humidity. If it is assumed that the outside air taken in through the air intake opening 9 of FIG. 2 has a temperature of 8° C. and a humidity of 40%, then the air is in a condition indicated by point A of the wet air chart of FIG. 3. Since the outside air is heated to a temperature equal to or higher than 10° C. by heating coil 1, the outside air having passed through the coil 1 will exhibit a condition at point B.

Figure 3:
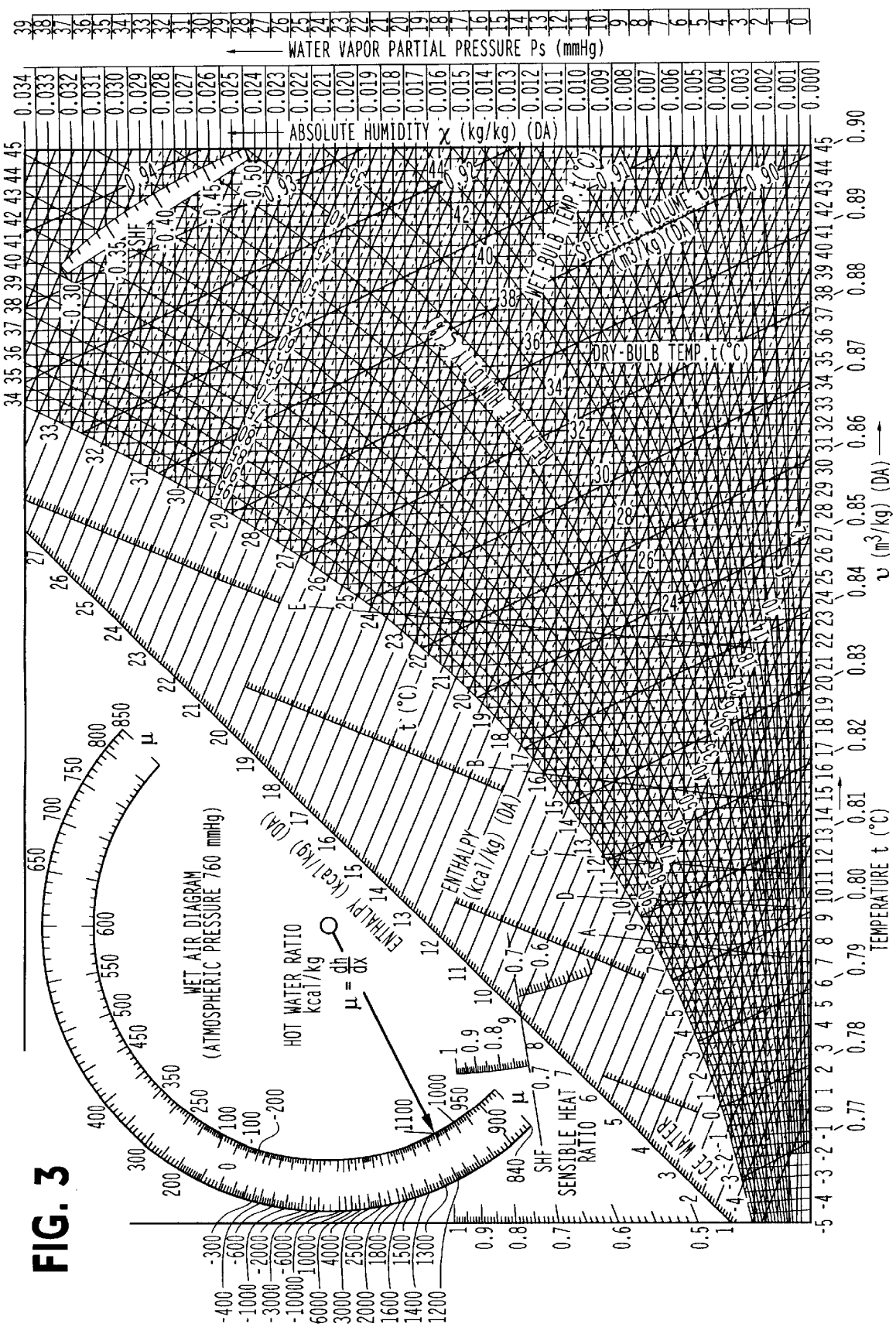
FIG. 3 is a wet air chart for explaining the embodiment of the present invention.

Then, when water of 10° C. is sprayed from the air washer 3, the outside air having passed through the air washer 3 will exhibit a condition at point C of FIG. 3. Thereafter, the outside air is dehumidified by the cooling coil 4 so that it will exhibit a condition indicated at point D. Finally, since the outside air is heated by heating coil 5, it will exhibit a condition indicated by point E and is supplied under such conditions into the room.

As described above, according to the present invention, since the water from the circulating water tank and water from the piping is cooled by the cooling means such as a heat exchanger and sprayed from the air washer, removal efficiencies for nitrogen oxides and sulfur oxides, in gaseous form, in the outside air, can be improved in comparison with that of the prior art.

Further, according to the present invention, since water in excess of water which is used for the humidification, dust removal and impurity removal by means of the air washer and stored in the circulating water tank has a low temperature, propagation of micro-organisms, which can propagate in water of the room temperature such as legionella pneumophila, in the water in the circulating water tank can be suppressed as compared with that of the prior art.

It is to be understood that variations and modifications of the fresh air harmonizer disclosed herein will be evident to those skilled in the art. It is intended that all such modifications and variations be included within the scope of the appended claims.

What is claimed is:

1. An outside air conditioner wherein water is sprayed from an air washer into outside air taken in by the outside air conditioner to clean and humidify the outside air, the temperatures and humidity of the outside air are adjusted, and thereafter the outside air is discharged to the outside, comprising:
    a circulating water tank that receives excess humidifying water sprayed from said air washer;
    a circulating pump that circulates the water received in said circulating water tank back to said air washer, and
    a heat exchanger that cools the water from said circulating water tank to a temperature lower than the ambient temperature.

2. The outside air conditioner as claimed in claim 1, wherein water for making up for a shortage of water to be sprayed from said air washer is supplied to said heat exchanger through a piping.

3. The outside air conditioner as claimed in claim 2, wherein the temperature of water to be sprayed from said air washer is set to 10° C.

4. The outside air conditioner as claimed in claim 1, wherein the temperature of water to be sprayed from said air washer is set to 10° C.

5. An outside air conditioner wherein water is sprayed from an air washer into outside air taken in to clean and humidify the outside air, the temperatures and humidity of the outside air are adjusted, and thereafter the outside air is taken out to the outside, comprising:
    means for supplying water of a temperature lower than the ambient temperature to said air washer, wherein the temperature of water to be sprayed from said air washer is set to 10° C.

6. An outside air conditioner, comprising:
    an outside air intake opening for taking in outside air;
    a mean temperature gauge for measuring a mean temperature of the outside air taken in through said outside air intake opening;
    a heating means for heating the outside air taken in through said fresh air intake opening to a temperature equal to or higher than a predetermined temperature based on the temperature of said mean temperature gauge;
    an air washer for spraying water to the outside air heated by said heating means to clean and humidify the outside air;
    a circulating water tank for receiving excess humidifying water sprayed from said air washer;
    a circulating pump for circulating the water received in said circulating water tank to said air washer;

a piping for supplying water to make up for a shortage of water to be sprayed from said air washer;

a heat exchanger for cooling the water from said circulating water tank and the water from said piping and supplying the cooled water to said air washer;

an adjusting means for adjusting the temperature and humidity of the outside air humidified and cleaned by said air washer; and a fan for discharging the outside air, whose temperature and humidity have been adjusted by said adjusting means, to the outside of said outside air conditioner.

7. The outside air conditioner as claimed in claim 6, wherein said heat exchanger cools the water to be supplied to said air washer to a temperature of 10° C.

* * * * *